(12) United States Patent
Marupaduga

(10) Patent No.: US 11,563,611 B1
(45) Date of Patent: Jan. 24, 2023

(54) ADJUSTING REFERENCE SIGNAL REPORTING BASED ON UPLINK CHANNEL CONDITIONS

(71) Applicant: Sprint Spectrum LP, Overland Park, KS (US)

(72) Inventor: Sreekar Marupaduga, Overland Park, KS (US)

(73) Assignee: Sprint Spectrum LP, Overland Park, KS (US)

( * ) Notice: Subject to any disclaimer, the term of this patent is extended or adjusted under 35 U.S.C. 154(b) by 16 days.

(21) Appl. No.: 17/026,857

(22) Filed: Sep. 21, 2020

(51) Int. Cl.
| | |
|---|---|
| H04L 27/26 | (2006.01) |
| H04L 5/00 | (2006.01) |
| H04W 76/15 | (2018.01) |
| H04L 5/10 | (2006.01) |
| H04W 24/08 | (2009.01) |
| H04L 25/02 | (2006.01) |
| H04W 52/24 | (2009.01) |

(52) U.S. Cl.
CPC ........ *H04L 27/2613* (2013.01); *H04L 5/0048* (2013.01); *H04L 5/10* (2013.01); *H04L 25/0226* (2013.01); *H04W 24/08* (2013.01); *H04W 52/242* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 8,259,700 B2 | 9/2012 | Li et al. | |
| 10,321,411 B2 | 6/2019 | Ouchi et al. | |
| 10,797,762 B1 * | 10/2020 | Sung | H04W 52/42 |
| 2018/0295637 A1 * | 10/2018 | Manolakos | H04W 72/1226 |
| 2019/0261379 A1 * | 8/2019 | Yerramalli | H04B 1/1027 |
| 2019/0288789 A1 * | 9/2019 | Li | H04L 47/14 |
| 2020/0092739 A1 * | 3/2020 | Yang | H04B 7/0626 |
| 2022/0190883 A1 * | 6/2022 | Kaya | H04W 36/08 |

* cited by examiner

*Primary Examiner* — Otis L Thompson, Jr.
(74) *Attorney, Agent, or Firm* — Jones Robb, PLLC

(57) ABSTRACT

Methods and systems for adjusting reference signal reporting based on path loss and fading and cell edge conditions experienced by wireless devices in 5G EN-DC networks. As the path loss increases, a period between reference signal reports (or a frequency of reference signal reports) can be increased. This ensures continued quality of service for the wireless devices. Reference signals can include SRS, DMRS, PTRS, etc.

16 Claims, 6 Drawing Sheets

ADJUSTING REFERENCE SIGNAL REPORTING BASED ON UPLINK CHANNEL CONDITIONS

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, different iterations of radio access technologies (RATs) may be deployed within a single wireless network. Such heterogeneous wireless networks can include newer 5G and millimeter Wave (mmWave) networks, as well as older legacy networks. In some cases, deployment of 5G new radio (NR) access nodes alongside or co-located with 4G long-term evolution (LTE) access nodes utilizes dual connectivity technology (e.g. EN-DC), wherein control information is transmitted using the 4G RAT and data is transmitted using the 5G RAT. There are various potential deployments of EN-DC, such as one-to-one (where a 4G eNodeB is collocated with a 5G gNodeB at the same cell site or radio access network), or distributed or one-to-many (where a 4G eNodeB at a first radio access network is coupled via X2 links to many different 5G gNodeBs, each within their own radio access network or cell site). Each radio access network (RAN) or cell site can further include a cell site router, which provides connectivity to other network elements, such as an intermediate or core network. The connection between the cell site router and other network elements closer to the core network may be referred to as a mobile backhaul.

Further, as wireless device technology improves, different wireless devices are configured to use different types of applications (such as voice over IP, streaming, gaming, etc.), and each different application may optimally function with a different channel size or bandwidth. While channel bandwidths in 4G are static, 5G can deploy various bandwidths, most of which are higher than 4G bandwidths. Further, wireless networks may be configured to utilize multiple-input-multiple-output (MIMO), in which multiple data streams can be directed towards one or more eligible wireless devices via various combinations of antennae and transceivers based on the orthogonality of transmission, thereby maximizing resources. MIMO can include single-user MIMO (SU-MIMO), multi-user MIMO (MU-MIMO), and massive MIMO (mMIMO), which extends MU-MIMO to antenna arrays coupled to base stations, the antenna arrays comprising large numbers of controllable antenna elements that enable directing several MU-MIMO streams to various groups or "pairings" of wireless devices. Beamforming is another transmission mode that is used to provide better coverage to wireless devices in specific locations within a coverage area of a cell or access node. A beamforming downlink transmission mode uses multiple antennae to direct or "steer" signals from the antennae towards a particular wireless device located at, for instance, a cell edge. Both beamforming and MU-MIMO require the use of multiple antennae, with any performance gains being proportional to a number of antennae deployed by a specific cell or access node. Further, both beamforming and MIMO have been identified as some of the promising air interface technologies to address the capacity requirement required demanded by 5G networks.

Beamforming, MIMO, and other transmissions modes are enabled by using reference signals. For example, wireless devices can transmit uplink reference signals that are analyzed by an access node to determine how to best serve these wireless devices via different transmission modes. While using uplink signals enabled better communication between wireless devices and access nodes, excessive uplink signaling can cause noise or interference in uplink channels and affect quality of service.

Overview

Exemplary embodiments described herein include methods, systems, and processing nodes for adjusting reference signal reporting based on uplink channel conditions such as path loss or fading and cell edge conditions. An exemplary method for adjusting reference signal reporting in dual-connectivity wireless networks based on channel conditions includes obtaining channel conditions for a communication channel between a wireless device and an access node and, based on the channel conditions, adjusting a reference signal reporting parameter for the wireless device.

Thus, an exemplary method for adjusting reference signal reporting can include determining that a path loss of a wireless device exceeds a threshold and increasing a reference signal reporting frequency for the wireless device.

Further, an exemplary method for adjusting reference signal reporting can include determining that a fading parameter of a wireless device exceeds a threshold and increasing a reference signal reporting frequency for the wireless device.

These operations can be performing for one or more wireless devices individually, or for all wireless devices within a sector. An exemplary method for adjusting reference signal reporting can include monitoring channel conditions of a communication channel between a wireless device and an access node, and responsive to changes in the channel conditions, adjusting one or more reference signal reporting parameters for the wireless device.

Further, an exemplary method for adjusting reference signal reporting can include monitoring channel conditions of a communication channel between one or more wireless devices within a sector and an access node, and responsive to changes in the channel conditions, adjusting one or more reference signal reporting parameters for all the wireless devices within the sector.

The exemplary embodiments described herein may be performed by a processing node within a system, such as a telecommunication system. For example, an exemplary system for adjusting reference signal reporting in dual-connectivity networks based on channel conditions can include an access node that is capable of simultaneously receiving uplink data via at least two different radio access technologies, and processing node communicatively coupled to the access node. The processing node can be configured to perform operations including any of the operations described herein in any combination.

For example, an exemplary processing node can be configured to perform operations including monitoring channel conditions for a communication channel between one or more wireless devices and an access node, and responsive to changes in the channel conditions, adjusting one or more reference signal reporting parameters for the one or more wireless devices. The channel conditions can include one or more of a path loss or a fading parameter, and the reference signal parameters can include one or more of a reporting frequency or a timing offset. The operations further include determining an increase in the path loss or the fading parameter and increasing the reporting frequency or adjusting the timing offset.

DETAILED DESCRIPTION

Figure 1:
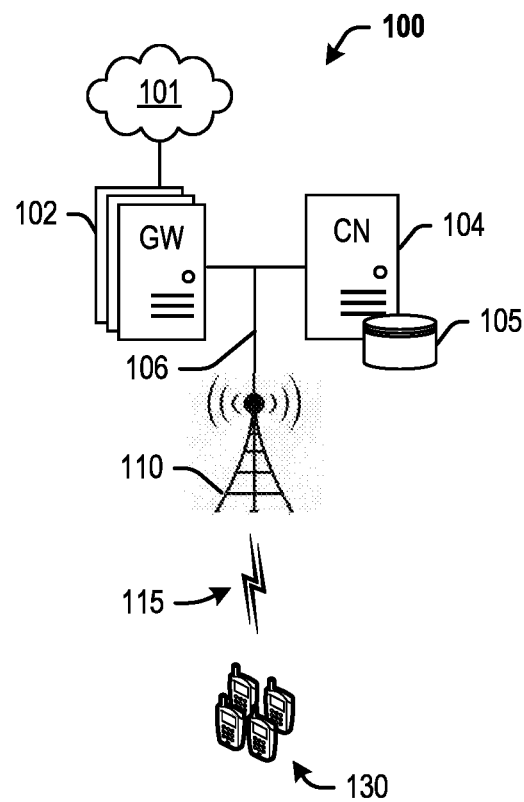
FIG. 1 depicts an exemplary system for adjusting reference signal reporting in dual-connectivity wireless networks based on channel conditions.

The following disclosure provides methods and systems for adjusting reference signal reporting based on path loss and fading and cell edge conditions experienced by wireless devices in 5G EN-DC networks. As the path loss increases, a period between reference signal reports (or a frequency of reference signal reports) can be increased. This ensures continued quality of service for the wireless devices.

Exemplary heterogeneous dual-connectivity wireless networks described herein include access nodes that are capable of communicating using a plurality of wireless air interfaces or RATs. For example, an access node can include a combination of a 4G eNodeB and a 5G gNodeB. In other words, the access node can be configured to communicate using 4G LTE as well using 5G NR. In some embodiments, the access node can include a 4G eNodeB coupled to a plurality of 5G gNodeBs (one-to-many or distributed configuration). In similar embodiments, the access nodes can be selected from either the eNodeB or one of the 5G gNodeBs. Thus, as further described herein, the access nodes can be part of the same or different cell sites or radio access networks (RANs), each RAN being served by a different cell site router.

Therefore, a method as described herein for adjusting reference signal reporting in dual-connectivity wireless networks based on channel conditions includes obtaining channel conditions for a communication channel between a wireless device and an access node and, based on the channel conditions, adjusting a reference signal reporting parameter for the wireless device. The adjusted reference signal reporting parameter can be transmitted to the wireless device, for example, in a radio resource control message or similar. The obtaining and adjusting operations can be performed for second and third wireless devices individually. In another embodiment, the wireless device can be one of a plurality of wireless devices within a wireless sector served by the access node. In this case, the method further includes obtaining channel conditions for a plurality of communication channels between the plurality of wireless devices and the access node and adjusting a sector-wide reference signal reporting parameter for the plurality of wireless devices in the wireless sector. The sector-wide reference signal reporting parameter can be broadcast to all wireless devices within the sector.

Exemplary channel conditions that are monitored to determine how to adjust the reference signal reporting parameter can include one or more of a path loss or a fading parameter. For example, a magnitude of a path loss as reported by wireless devices can be used to adjust the reference signal reporting frequency or period. Alternatively or in addition, a fading parameter or a cell edge signal condition can be used to adjust the reference signal reporting frequency or period. Therefore, determining an increase in the path loss can trigger an increase in a reference signal reporting frequency. Further, the reference signal reporting parameter is associated with an uplink signal. For example, the uplink signal can include any of a sounding reference signal (SRS), a demodulation reference signal (DMRS), or a phase tracking reference signal (PTRS). While the subject disclosure presents details related to these uplink signals and their parameters, other parameters for different reference signals and adjustments thereof may be envisioned by those having ordinary skill in the art in light of this disclosure.

Further, the communication channel for which channel conditions are obtained/monitored can utilize at least two radio access technologies (RATs), such that the channel condition is associated with at least one of the two RATs, and the reference signal parameter is adjusted for said at least one of the two RATs. For example, different RAN configurations for EN-DC capable access nodes are described, with each RAN configuration enabling participation in dual-connectivity using at least two RATs. Exemplary access nodes described herein include schedulers that are configured to adjust reference signal reporting parameters, the schedulers being coupled to different types of access nodes including eNodeBs, gNodeBs, etc. For example, each access node can include a primary access node configured to deploy carriers utilizing the a first RAT, and the primary access node is coupled to one or more secondary access nodes, each secondary access node configured to deploy carriers utilizing a second RAT. Alternatively, each access node comprises a secondary access node configured to deploy carriers utilizing the second RAT, the secondary access node being coupled to a primary access node configured to deploy carriers utilizing the first RAT.

Thus, exemplary systems described herein for adjusting reference signal reporting parameters include one or more access nodes configured to deploy at least a 4G wireless air interface and a 5G wireless air interface, and a processing node communicatively coupled to the access node(s). The processing node can be configured to perform any of the above operations in various combinations. These and other embodiments are further described herein and with reference to FIGS. 1-9.

FIG. 1 depicts an exemplary system 100 comprising a communication network 101, gateway 102, controller node 104, access node 110, and wireless devices 130. In this exemplary embodiment, access node 110 may be a macrocell access node configured to deploy wireless air interfaces to which wireless devices 130 can attach and access network services from network 101. Further, access node 110 may be configured to deploy at least two wireless air interfaces 115 using dual connectivity. For example, access node 110 can include a combination of an eNodeB and a gNodeB, such that each access node is be configured to deploy a wireless air interface using a first RAT (e.g. 4G LTE) and a second RAT (e.g. 5G NR). Each RAT can be configured to utilize a different frequency band or sub-band, a different channel size or bandwidth, and so on. For example, the 5G NR wireless air interface can be configured to utilize higher frequencies and larger channel bandwidths than the 4G LTE wireless air interface. Thus, the 5G NR wireless air interface can be used to deploy beamforming or MU-MIMO transmission modes. Further, access node 110 can be configured to communicate using both RATs at the same time. For example, dual connections can be more than one of wireless devices 130 functioning as relay nodes using both 4G and 5G wireless air interfaces 115, with the 4G wireless air interface being used to transmit control information, and the 5G wireless air interface being used to transmit data information (e.g. via MIMO or beamforming). A processing node within system 100 (for example, communicatively coupled to access node 110 or any other network node) can be configured to determine whether or not each wireless device 130 is capable of dual connectivity and/or communication using 5G NR, and instruct the access node 110 to broadcast an indicator in, for example, a system information message. Responsive to the indicator, wireless devices 130 can attach to access node 110 using the 4G wireless air interface to control and set up a dual connectivity session. In other words, control information (including SIB messages) is transmitted using the 4G LTE wireless air interface, while the 5G NR wireless air interface is utilized for transmission of data. Using the 5G RAT for data transmissions is advantageous, as 5G provides higher bandwidths and frequencies versus 4G. Although only access node 110 and wireless devices 130 are illustrated in FIG. 1, system 100 can include various other combinations of carriers/wireless air interfaces, antenna elements, access nodes, and wireless devices, as may be evident to those having ordinary skill in the art in light of this disclosure.

In an exemplary embodiment, the processing node is further is configured to perform operations for adjusting reference signal reporting based on channel conditions by obtaining channel conditions for communication channel(s) over wireless air interfaces 115 (between one or more of wireless devices 130 and access node 110), and adjusting a reference signal reporting parameter for the one or more of wireless devices 130 based on the channel conditions. The adjusted reference signal reporting parameters can be transmitted to the wireless device(s) 130 e.g. in an RRC message or equivalent. The obtaining and adjusting operations can be performed individually for each wireless device 130, such that different wireless devices 130 utilize different time periods or frequencies of reporting reference signals. Alternatively or in addition, channel conditions are obtained for a plurality of communication channels over wireless air interface 115 between wireless devices 130 and access node 110, and a sector-wide reference signal reporting parameter for the plurality of wireless devices 130 in the wireless sector is determined based on the channel conditions. For example, an average path loss, cell edge condition, or fading parameter can be determined for wireless devices 130. The sector-wide reference signal reporting parameter can be broadcast to all wireless devices 130 within the sector.

As described herein, the channel conditions can include one or more of a path loss or a fading parameter. Generally, as channel conditions change with time due to changes in the environment between the access node 110 and wireless device 130, and mobility of wireless devices 130. Radio signals are attenuated as they travel through the air. When a transmitted signal propagates through the air it encounters different objects, and the signal will be attenuated, delayed in time and phase shifted due to reflection, diffraction and scattering. The attenuation caused by distance is modeled as path loss. Path loss, or path attenuation, is the reduction in power density (attenuation) of an electromagnetic wave as it propagates through space. Path loss is a major component in the analysis and design of the link budget of a telecommunication system. This term is commonly used in wireless communications and signal propagation. Path loss may be due to many effects, such as free-space loss, refraction, diffraction, reflection, aperture-medium coupling loss, and absorption. Path loss is also influenced by terrain contours, environment (urban or rural, vegetation and foliage), propagation medium (dry or moist air), the distance between the transmitter and the receiver, and the height and location of antennas. The path loss can be measured between a transmit power of a signal transmitted by a wireless device 130 and received power of the signal received at the access node 110. The path loss may be measured at the access node 110 based on a known transmit power of the wireless device 130. In other words, the path loss indicates a loss of power of a signal between transmission and reception. Generally, the path loss can be used by the access node to perform fractional power control operations, which can include instructing a wireless device 130 to increase a transmit power based on the measured path loss. In another exemplary embodiment, the path loss may be equivalent to a path loss of a downlink signal measured at the wireless device 130. In other words, since the path loss is representative of signal losses occurring in the space between the wireless device and the access node, uplink and downlink signals are likely to suffer the same amount of path losses. Further, the fading parameter can indicate any variation of the attenuation of a signal with various variables. These variables include time, geographical position, and radio frequency. Fading is often modeled as a random process. A fading channel is a communication channel that experiences fading. In wireless systems, fading may either be due to multipath propagation, referred to as multipath-induced fading, weather (particularly rain), or shadowing from obstacles affecting the wave propagation, sometimes referred to as shadow fading. The signal variations due to diffraction are modeled as shadow fading (shadowing), whereas the effects of reflections are taken as multipath fading (multipath).

Thus, upon determining an increase in the path loss or fading parameter, the reference signal reporting parameter can be adjusted. For example, if the reference signal reporting parameter is a frequency, then the frequency is increased responsive to the path loss or fading parameter increasing past a threshold. Further, the reference signal reporting parameter is associated with an uplink signal. For example, the uplink signal can include one or more of: a sounding reference signal (SRS), a demodulation reference signal (DMRS), or a phase tracking reference signal (PTRS). The SRS is typically transmitted by the wireless devices 130 to help the access node 110 obtain the channel state information (CSI) for each user. The CSI describes how data is propagated (via 4G or 5G wireless air interface 115) from the wireless devices 130 to the access node 110, and can indicate the combined effect of scattering, fading, and power decay with distance. System 100 can use the SRS for resource scheduling, link adaptation, massive MIMO, and beam management (e.g. beamforming). The SRS can be transmitted by wireless devices 130 on the last symbol of a subframe, and reports the channel quality of overall bandwidth, based on which the access node 110 can assign resources for specific bandwidth channels versus other regions of bandwidth. Information in the SRS can be specific to a wireless device 130. Multiple SRS symbols allow coverage extension and increased sounding capacity. There can be two or more types of SRS as defined in sections 36.211 of the 3GPP specification: cell specific (common SRS) and device specific (dedicated SRS). Further, there are periodic and aperiodic SRS. Thus, a reporting parameter for the SRS can also include a periodicity, with a minimum periodicity of SRS being 2 ms (1 ms=1 subframe) and the maximum being 320 ms. Access nodes can distinguish the device-specific SRS in case of overlapped SRS transmission, using transmission_comb parameter and cyclic shift parameters configurable via the RRC setup and RRC reconfiguration messages. Further, the DMRS can be an uplink or downlink signal, is specific for specific wireless devices 130, and used to estimate the radio channel. The DMRS can be beamformed, scheduled within a scheduled resource, and transmitted only when necessary in either downlink or uplink. Additionally, multiple orthogonal DMRSs can be allocated to support MIMO transmission. The access node 110 can configure the DMRS during initial decoding requirement that low-latency applications need, but it only occasionally presents this information for low-speed scenarios in which the channel shows little change. In high-mobility scenarios to track fast changes in channel, the rate of transmission of the DMRS signal can be increased. The DMRS is used by a receiver for radio channel estimation for demodulation of associated physical channel. DMRS design and mapping is specific to each Downlink and Uplink NR channels including NR-PBCH, NR-PDCCH, NR-PDSCH, NR-PUSCH, NR-PUSCH. The DMRS is used for channel estimation and for coherent demodulation. If the DMRS is of poor quality or not decoded properly by access node 110, the PUSCH or PUCCH will be not decoded as well. Hence DMRS indicates a channel quality of a frequency region in which PUSCH or PUCCH is being transmitted. For example, the measured or obtained channel conditions can be is associated with at least one of the two RATs (i.e. 4G, 5G) and the reference signal parameter is adjusted for said at least one of the two RATs. Positioning of DMRS in the resource grid varies according to the PUCCH format indicator. But in case of PUSCH it can be the center symbol of a slot. To support a large number of wireless devices 130, a large number of DMRS sequences may be used, and achieved by cyclic shifts of a base sequence. DMRS can enhance MIMO transmission and each wireless device 130 can use different DMRS sequences. The DMRS can be mapped to the PUSCH in multiples of 12 sub-carriers, while the DMRS mapped to the PUCCH can be in terms of 12 sub-carriers. The DMRS is similar to the SRS in that both use constant amplitude zero autocorrelation (CAZAC) sequences. Meanwhile, other types of reference signals and parameters thereof that are not described herein can be envisioned by those having ordinary skill in the art, including phase tracking reference signals (PTRS), channel state information reference signals (CSI-RS), and so on.

Access node 110 can be any network node configured to provide communication between wireless devices 130 and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area in the range of approximately five kilometers to thirty-five kilometers and an output power in the tens of watts. Alternatively, access node 110 may comprise any short range, low power, small-cell access node such as a microcell access node, a picocell access node, a femtocell access node, or a home eNodeB/gNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with each other, and other access nodes (not shown), using a wireless link or a wired link such as an X2 link. Components of exemplary access node 110 and processing nodes coupled thereto are further described with reference to FIGS. 2-3.

Wireless devices 130 may be any device, system, combination of devices, or other such communication platform capable of communicating wirelessly with access node 110 using one or more frequency bands deployed therefrom. Wireless devices 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof.

Communication link 106 can be wired or wireless and use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication link 106 can be direct links or might include various equipment, intermediate components, systems, and networks, such as a cell site router, etc. Communication link 106 may comprise many different signals sharing the same link. Communication link 106 may be associated with many different reference points, such as N1-Nxx, as well as S1-Sxx, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW), a public data network gateway (PGW), and/or a systems architecture evolution gateway (SAE-GW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a control gateway (SGW-C or PGW-C), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as historic channel conditions of wireless air interface 115, channel condition reports from wireless devices 130, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, gateway(s) 102, controller node 104, and/or network 101.

Figure 2:
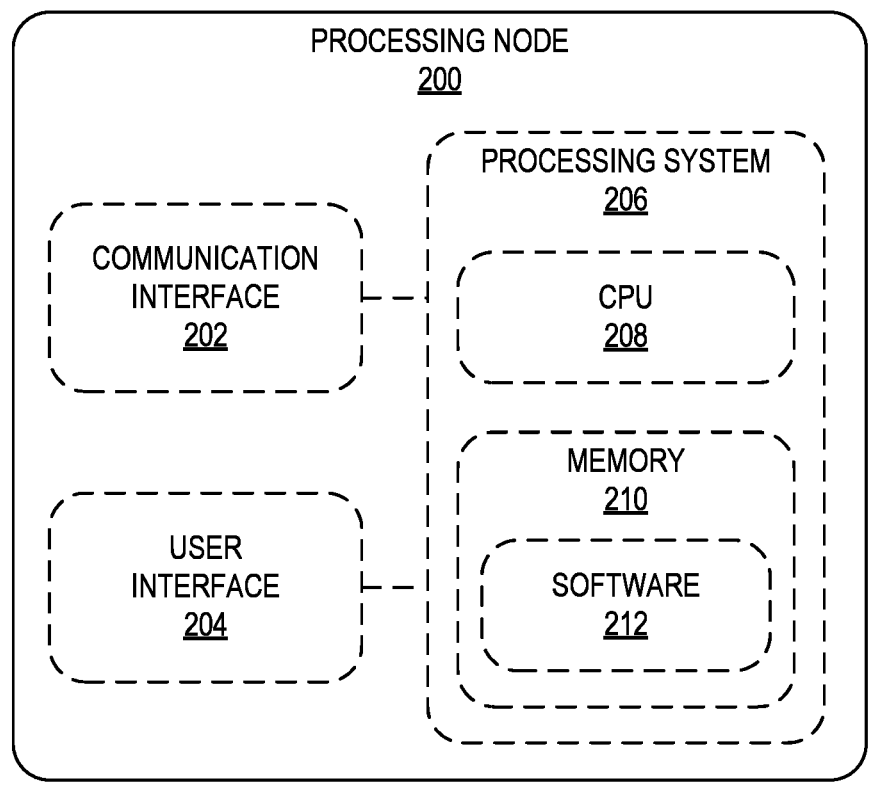
FIG. 2 depicts an exemplary processing node for adjusting reference signal reporting in dual-connectivity wireless networks based on channel conditions.

FIG. 2 depicts an exemplary processing node 200. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Further, memory 210 can store a software 212, which may be executed to perform the operations described herein. In an exemplary embodiment, software 212 can include instructions for adjusting reference signal reporting based on uplink channel conditions by obtaining channel conditions for a communication channel between a wireless device and an access node and, based on the channel conditions, adjusting a reference signal reporting parameter for the wireless device. In another exemplary embodiment, software 212 can include instructions for adjusting reference signal reporting by determining that a path loss of a wireless device exceeds a threshold, and increasing a reference signal reporting frequency for the wireless device. In another exemplary embodiment, software 212 can include instructions for adjusting reference signal reporting by determining that a fading parameter of a wireless device exceeds a threshold, and increasing a reference signal reporting frequency for the wireless device. These operations can be performing for one or more wireless devices individually, or for all wireless devices within a sector. In another exemplary embodiment, software 212 can include instructions for adjusting reference signal reporting by monitoring channel conditions of a communication channel between a wireless device and an access node, and responsive to changes in the channel conditions, adjusting one or more reference signal reporting parameters for the wireless device. In another exemplary embodiment, software 212 can include instructions for adjusting reference signal reporting by monitoring channel conditions of a communication channel between one or more wireless devices within a sector and an access node, and responsive to changes in the channel conditions, adjusting one or more reference signal reporting parameters for all the wireless devices within the sector.

Figure 3:
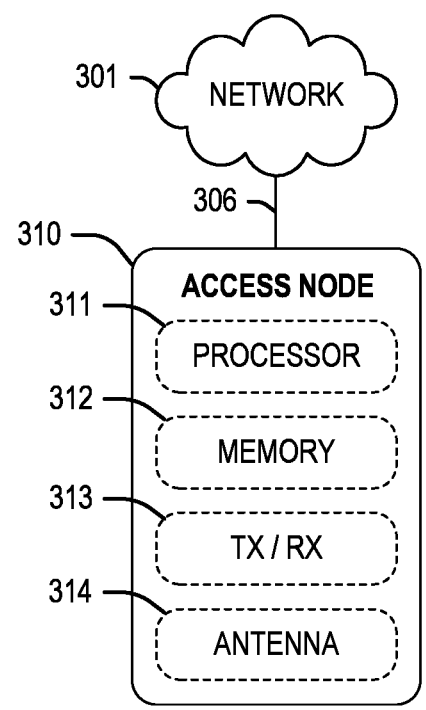
FIG. 3 depicts an exemplary access node for adjusting reference signal reporting in dual-connectivity wireless networks based on channel conditions.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, a transceiver 313, and antennae 314 (hereinafter referred to as antenna elements 314). Processor 311 executes instructions stored on memory 312, and transceiver 313 (in conjunction with antenna elements 314) enable wireless communication respectively at least two wireless air interfaces, such as 4G LTE and 5G NR. For example, access node 310 may be configured to transmit control information using a first set of antennae elements 314 configured to utilize a 4G LTE interface, and data information using a second set of antennae elements 314 configured to utilize a 5G NR air interface. Alternatively or in addition, each separate air interface maintains its own control and data transmissions. Further, antenna elements 314 may include an array of antenna elements that are configured to deploy air interfaces over one or more wireless sectors, form beams within these sectors, employ multiple-input-multiple-output (MIMO), etc.

In an exemplary embodiment, memory 312 can store instructions for adjusting reference signal reporting based on uplink channel conditions by obtaining channel conditions for a communication channel between a wireless device and an access node and, based on the channel conditions, adjusting a reference signal reporting parameter for the wireless device. In another exemplary embodiment, memory 312 can include instructions for adjusting reference signal reporting by determining that a path loss of a wireless device exceeds a threshold, and increasing a reference signal reporting frequency for the wireless device. In another exemplary embodiment, memory 312 can include instructions for adjusting reference signal reporting by determining that a fading parameter of a wireless device exceeds a threshold, and increasing a reference signal reporting frequency for the wireless device. These operations can be performing for one or more wireless devices individually, or for all wireless devices within a sector. In another exemplary embodiment, memory 312 can include instructions for adjusting reference signal reporting by monitoring channel conditions of a communication channel between a wireless device and an access node, and responsive to changes in the channel conditions, adjusting one or more reference signal reporting parameters for the wireless device. In another exemplary embodiment, memory 312 can include instructions for adjusting reference signal reporting by monitoring channel conditions of a communication channel between one or more wireless devices within a sector and an access node, and responsive to changes in the channel conditions, adjusting one or more reference signal reporting parameters for all the wireless devices within the sector.

Figure 4:
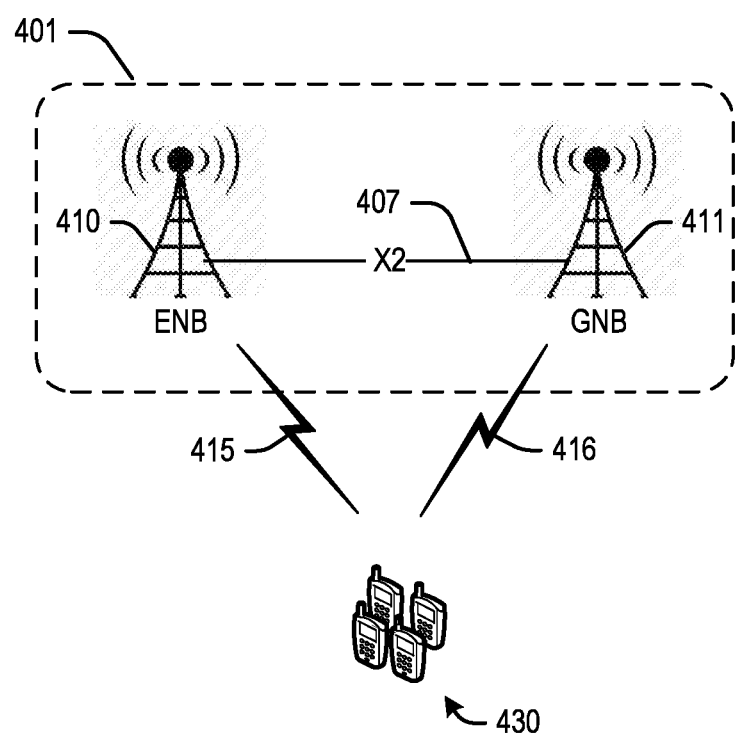
FIG. 4 depicts an exemplary collocated access node in a dual-connectivity network.

FIG. 4 depicts an exemplary collocated 5G EN-DC radio access network (RAN) 401. RAN 401 includes a pair of collocated access nodes (e.g. eNodeB 410, and gNodeB 411), and may include other components not shown herein for convenience, such as cell site routers, controllers, etc. Further, RAN 401 may be connected to other intermediate or core networks. In this exemplary embodiment, eNodeB 410 can be configured to deploy a wireless interface 415 using a first radio access technology (RAT), e.g. 4G LTE, and gNodeB 411 can be configured to deploy a second wireless interface 416 using a second RAT, e.g. 5G NR. Each RAT can be configured to utilize a different frequency band or sub-band, a different channel size or bandwidth, and so on. For example, the 5G NR wireless interface 416 can be configured to utilize higher frequencies and larger channel bandwidths than the 4G LTE wireless interface 415.

Further, access nodes 410, 411 can be configured to communicate using both RATs at the same time. For example, dual connections can be set up with any of wireless devices 430 using both 4G and 5G air interfaces 415, 416, the 4G wireless air interface 415 being used to transmit control information, and the 5G wireless air interface 416 being used to transmit data information. For example, a processing node within RAN 401 (for example, communicatively coupled to eNodeB 410, gNodeB 411, or any other network node) can be configured to determine whether or not wireless devices 430 are capable of communicating using both RATs (e.g. capable of 5G EN-DC), and instruct the eNodeB 410 to broadcast an indicator in, for example, a system information message. Responsive to the indicator, wireless devices 430 can attach to eNodeB 410 which can use the 4G carrier to control and set up a dual connectivity session with the wireless devices 430. In other words, control information (including SIB messages) is transmitted from the eNodeB 410 using the 4G LTE air interface, while the 5G NR air interface is utilized for transmission of data via gNodeB 411. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth. Further, within radio access network 402, eNodeB 410 and gNodeB 411 can be coupled via a direct communication link 407, which can include an X2 communication link. eNodeB 410 and gNodeB 411 can communicate control and data information across X2 communication link 407. In an exemplary embodiment, gNodeB 411 includes logic to determine how to allocate data packets between eNodeB 410 and gNodeB 411, wherein the data packets flow between wireless devices 430 and any external network node. Such logic may include a packet data convergence protocol (PDCP) function. Thus, RAN 401 can include a plurality of antenna elements (not shown herein) coupled to eNodeB 410 and gNodeB 411, with different antenna elements configured to deploy a different radio air interface using a different frequency.

Further, the processing node within RAN 401 can be configured to perform operations for adjusting reference signal reporting based on channel conditions by obtaining channel conditions for communication channel(s) over wireless air interfaces 415, 416 (between one or more of wireless devices 430 and eNodeb 410 and/or gNodeB 411), and adjusting a reference signal reporting parameter for the one or more of wireless devices 430 based on the channel conditions. The adjusted reference signal reporting parameters can be transmitted to the wireless device(s) 430 e.g. in an RRC message or equivalent. The obtaining and adjusting operations can be performed individually for each wireless device 430, such that different wireless devices 430 utilize different time periods or frequencies of reporting reference signals. Alternatively or in addition, channel conditions are obtained for a plurality of communication channels over wireless air interfaces 415, 416 between wireless devices 430 and eNodeB 410 and/or egNodeB 411, and a sector-wide reference signal reporting parameter for the plurality of wireless devices 430 in the wireless sector is determined based on the channel conditions. For example, an average path loss, cell edge condition, or fading parameter can be determined for wireless devices 430. The sector-wide reference signal reporting parameter can be broadcast to all wireless devices 430 within the sector. As described herein, the channel conditions can include one or more of a path loss or a fading parameter. The path loss can be measured between a transmit power of a signal transmitted by a wireless device 430 and received power of the signal received at the access node 410. The path loss may be measured at the eNodeB 410 and/or gNodeB 411 based on a known transmit power of the wireless device 430. Upon determining an increase in the path loss or fading parameter, the reference signal reporting parameter can be adjusted. For example, if the reference signal reporting parameter is a frequency, then the frequency is increased responsive to the path loss or fading parameter increasing past a threshold. Further, the reference signal reporting parameter is associated with an uplink signal. For example, the uplink signal can include one or more of: a sounding reference signal (SRS), a demodulation reference signal (DMRS), or a phase tracking reference signal (PTRS). Other types of reference signals and parameters thereof that are not described herein can be envisioned by those having ordinary skill in the art, including phase tracking reference signals (PTRS), channel state information reference signals (CSI-RS), and so on.

Further in this embodiment, the channel conditions are obtained/monitored for one or both wireless air interfaces 415, 416 and the reference signal parameter is adjusted for said at least one of the two RATs. For example, if the eNodeB 410 is transmitting control information via beamforming, then the channel conditions for 4G wireless air interface 415 are monitored, and reporting parameter for 4G wireless air interface 415 is adjusted. Whereas, if the gNodeB 411 is transmitting beamformed or MIMO data, then the channel conditions are obtained/monitored (and reporting parameter adjusted) for the 5G wireless air interface 416.

Figure 5:
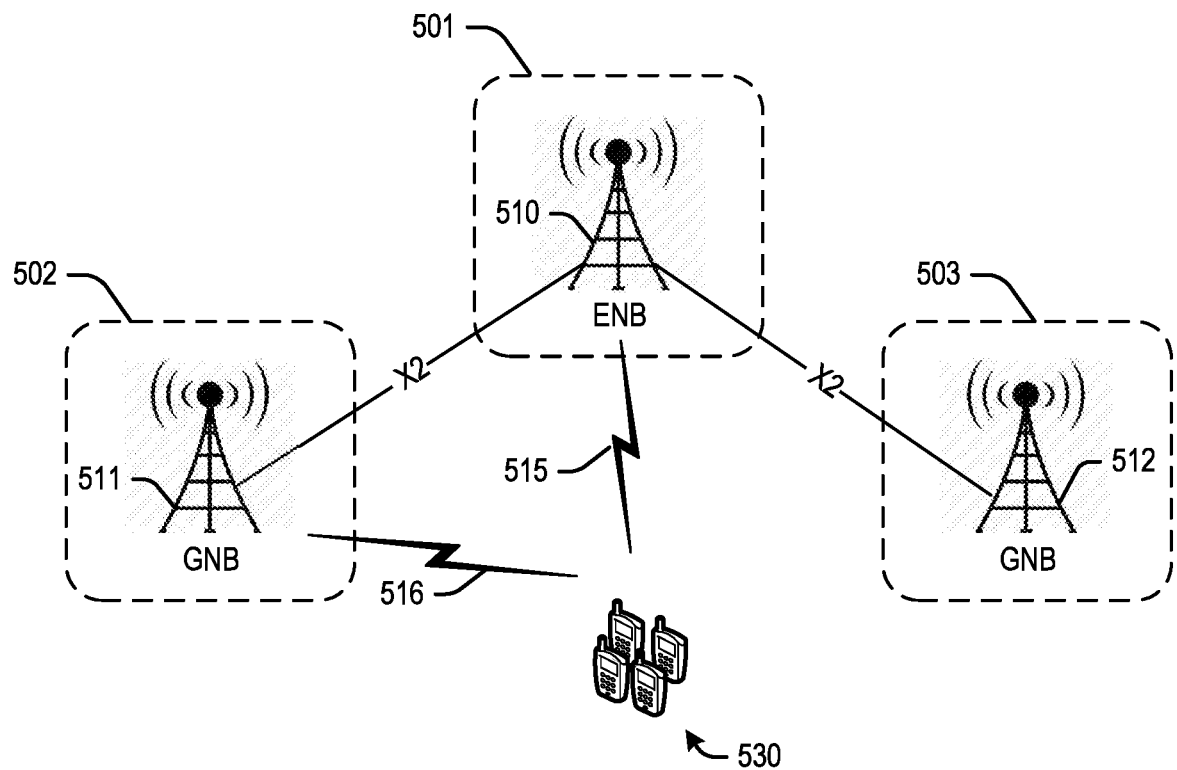
FIG. 5 depicts exemplary distributed access nodes in a dual-connectivity network.

FIG. 5 depicts reference signal reporting adjustment performed in an exemplary distributed 5G EN-DC system. Each of RANs 501, 502, 503 includes at least access nodes 510, 511, 512 respectively. This embodiment depicts a one-to-many configuration, in which an access node configured as an eNodeB 510 is designated as a primary access node for wireless devices 530, and one or more access nodes configured as gNodeBs 511, 512 are selected as secondary access nodes, as further described below. Persons having ordinary skill in the art may note that other components may be included in any combination, without materially affecting the scope and spirit of the described embodiments.

In this exemplary embodiment, eNodeB 510 can be configured to deploy a wireless interface 515 using a first radio access technology (RAT), e.g. 4G LTE, and gNodeBs 511, 512 can be configured to deploy wireless interfaces using a second RAT, e.g. 5G NR. Further, access nodes 510, 511, 512 can be configured to communicate using both RATs at the same time. For example, dual connections can be set up with wireless devices 530 using both 4G and 5G air interfaces respectively, the 4G wireless interface 515 being used to transmit control information, and one of the 5G wireless interfaces (e.g. 5G interface 516) being used to transmit data information. For example, a processing node communicatively coupled to eNodeB 510 can be configured to determine whether or not wireless devices 530 are capable of communicating using both RATs (e.g. capable of 5G EN-DC), and instruct the eNodeB 510 to broadcast an indicator in, for example, a system information message. Responsive to the indicator, wireless devices 530 can attach to eNodeB 510 which can use the 4G carrier to control and set up a dual connectivity session with wireless devices 530. Further, eNodeB 510 can be configured to select one (or more) of gNodeBs 511, 512 as a secondary access node, to transport user data. In other words, control information (including SIB messages) is transmitted from the eNodeB 510 using the 4G LTE air interface, while the 5G NR air interfaces (e.g. 5G NR air interface 516) is utilized for transmission of data. Further, gNodeBs 511 and 512 (hereinafter "secondary access nodes") can each be coupled to eNodeB 510 (hereinafter "primary access node") via X2 communication links. In an exemplary embodiment, each secondary access node 511, 512 can include logic to determine how to allocate data packets between the access nodes, wherein the data packets flow between wireless devices 530 and a network node not shown herein. Such logic may include a packet data convergence protocol (PDCP) function.

Further, a processing node communicatively coupled to any of eNodeB 510 and/or gNodeBs 511, 512 can be configured to allocate air interface resources to wireless devices 530 by identifying wireless devices 530 as being within range of one of access nodes 510-512, and preferentially allocating air interface resources to the wireless devices 530 based on a bandwidth capability of each wireless device 530. The bandwidth capability can be associated with a capability of each wireless device 530 to participate in 4G LTE, 5G NR, or any other radio access technology (RAT). Allocating or scheduling the resources can further include scheduling uplink resources for reference signals from wireless devices 530. For example, a channel condition indicator is received from one or more of wireless devices 530, and it is determined whether or not the channel condition indicator meets or exceeds one or more thresholds. Based on this, a reference signal reporting parameter is adjusted, as described herein. Various other combinations of these operations may be envisioned by those having ordinary skill in the art in light of this disclosure, including the operations further described below with reference to FIGS. 6-8.

Figure 6:
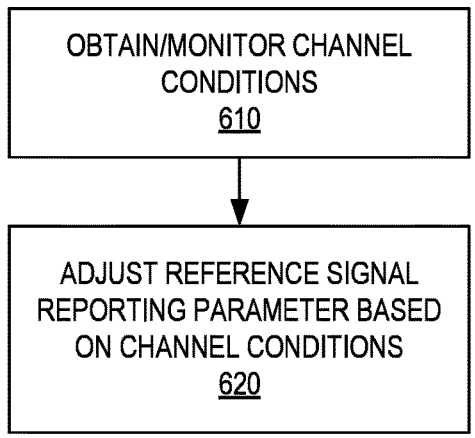
FIG. 6 depicts an exemplary method for adjusting reference signal reporting in dual-connectivity wireless networks based on channel conditions.

FIG. 6 depicts an exemplary method for adjusting reference signal reporting in dual-connectivity wireless networks based on channel conditions. The method of FIG. 6 may be implemented by a processing node communicatively coupled to one or more access nodes, controller nodes, or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, channel conditions are obtained and/or monitored for one or more wireless devices attached to an access node and, at 620, reference signal reporting parameters are adjusted based on the channel conditions. The access node can include a combination of a 4G eNodeB and a 5G gNodeB that is configured to communicate using 4G LTE as well using 5G NR. In some embodiments, the access node can include a 4G eNodeB coupled to a plurality of 5G. Exemplary channel conditions that are monitored to determine how to adjust the reference signal reporting parameter can include one or more of a path loss or a fading parameter. For example, a magnitude of a path loss as reported by wireless devices can be used to adjust the reference signal reporting frequency or period. Alternatively or in addition, a fading parameter or a cell edge signal condition can be used to adjust the reference signal reporting frequency or period. Therefore, determining an increase in the path loss can trigger an increase in a reference signal reporting frequency. Further, the reference signal reporting parameter is associated with an uplink signal. For example, the uplink signal can include any of a sounding reference signal (SRS), a demodulation reference signal (DMRS), or a phase tracking reference signal (PTRS). While the subject disclosure presents details related to these uplink signals and their parameters, other parameters for different reference signals and adjustments thereof may be envisioned by those having ordinary skill in the art in light of this disclosure. The adjusted reference signal reporting parameter can be transmitted to the wireless device, for example, in a radio resource control message or similar.

Further, the communication channel for which channel conditions are obtained/monitored can utilize at least two radio access technologies (RATs), such that the channel condition is associated with at least one of the two RATs, and the reference signal parameter is adjusted for said at least one of the two RATs. For example, different RAN configurations for EN-DC capable access nodes are described, with each RAN configuration enabling participation in dual-connectivity using at least two RATs. Each access node can include a primary access node configured to deploy carriers utilizing the first RAT, and the primary access node is coupled to one or more secondary access nodes, each secondary access node configured to deploy carriers utilizing a second RAT. Alternatively, each access node comprises a secondary access node configured to deploy carriers utilizing the second RAT, the secondary access node being coupled to a primary access node configured to deploy carriers utilizing the first RAT.

Figure 7:
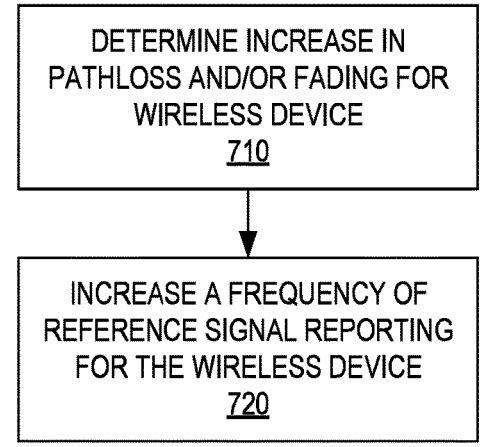
FIG. 7 depicts another exemplary method for adjusting reference signal reporting for a wireless device based on channel conditions of the wireless device.

FIG. 7 depicts an exemplary method for adjusting reference signal reporting for wireless devices individually. The method of FIG. 7 may be implemented by a processing node communicatively coupled to one or more access nodes, controller nodes, or any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, an increase in a path loss and/or fading parameter is determined for a wireless device and, at 720 a frequency of reference signal reporting is increased for the wireless device. The path loss and/or fading parameter may be among several exemplary channel conditions that are monitored to determine how to adjust the reference signal reporting parameter. For example, a magnitude of a path loss as reported by wireless devices can be used to adjust the reference signal reporting frequency or period. Alternatively or in addition, a fading parameter or a cell edge signal condition can be used to adjust the reference signal reporting frequency or period. Therefore, determining an increase in the channel condition can trigger an increase in a reference signal reporting frequency. Further, the reference signal reporting parameter is associated with an uplink signal. For example, the uplink signal can include any of a sounding reference signal (SRS), a demodulation reference signal (DMRS), or a phase tracking reference signal (PTRS).

Figure 8:
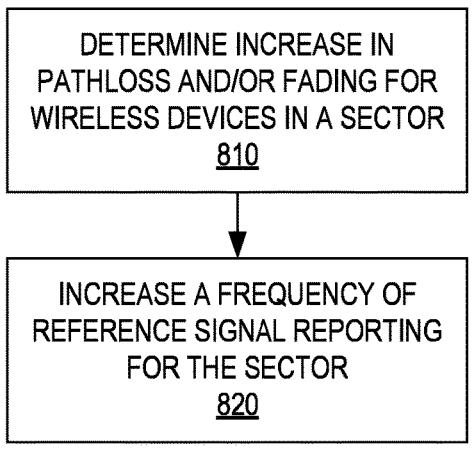
FIG. 8 depicts another exemplary method for adjusting reference signal reporting for a sector based on channel conditions of wireless devices in the sector.

FIG. 8 depicts an exemplary method for adjusting reference signal reporting in dual-connectivity wireless networks based on channel conditions. The method of FIG. 8 may be implemented by a processing node communicatively coupled to one or more access nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, an increase in a path loss and/or fading parameter is determined and, at 820 a frequency of reference signal reporting is increased. The path loss and/or fading parameter may be among several exemplary channel conditions that are monitored to determine how to adjust the reference signal reporting parameter. In this case, the channel conditions are obtained for a plurality of communication channels between the plurality of wireless devices and the access node, and a sector-wide reference signal reporting parameter is adjusted for the plurality of wireless devices in the wireless sector. The sector-wide reference signal reporting parameter can be broadcast to all wireless devices within the sector. For example, an average magnitude of a path loss as reported by wireless devices can be used to adjust the reference signal reporting frequency or period for the sector. Alternatively or in addition, an average fading parameter or a cell edge signal condition can be used to adjust the reference signal reporting frequency or period for the sector. Therefore, determining an increase in the channel conditions within the sector can trigger an increase in a reference signal reporting frequency for the sector.

Further, while 4G LTE and 5G NR are described in the above embodiments, the disclosed operations may apply to different combinations of radio air interfaces, including any combination of radio air interfaces within the same or different radio-access technologies, such as multiple different 4G carriers with different bandwidths, 5G carriers with different bandwidths, or any future wireless technology. So long as the described allocations of resources for relay nodes with different bandwidth capabilities is performed as described herein, the specific implementation and network topology is less relevant.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for adjusting reference signal reporting in dual-connectivity wireless networks based on channel conditions, the method comprising,
   obtaining channel conditions for a plurality of communication channels between a plurality of wireless devices and an access node within a wireless sector served by the access node; and
   based on the channel conditions, adjusting a sector-wide reference signal reporting parameter for the plurality of wireless devices in the wireless sector.

2. The method of claim 1, further comprising transmitting the adjusted reference signal reporting parameter to the plurality of wireless devices.

3. The method of claim 1, further comprising broadcasting the sector-wide reference signal reporting parameter to all wireless devices of the plurality of wireless devices within the sector.

4. The method of claim 1, wherein the channel conditions comprise one or more of a pathloss or a fading parameter.

5. The method of claim 4, further comprising determining an increase in the pathloss; and increasing the reference signal reporting parameter, wherein the reference signal reporting parameter comprises a frequency.

6. The method of claim 1, wherein the reference signal reporting parameter is associated with an uplink signal.

7. The method of claim 6, wherein the uplink signal comprises one or more of: a sounding reference signal (SRS), a demodulation reference signal (DMRS), or a phase tracking reference signal (PTRS).

8. The method of claim 1, wherein:
   at least one communication channel of the plurality of communication channels utilizes at least two radio access technologies (RATs),
   the channel condition is associated with at least one of the two RATs, and
   the reference signal parameter is adjusted for said at least one of the two RATs.

9. A system for adjusting reference signal reporting in dual-connectivity wireless networks based on channel conditions, the system comprising:
   a processing node; and
   a processor coupled to the processing node configured to perform operations comprising:
      monitoring channel conditions for a plurality of communication channels between a plurality of wireless devices and an access node within a wireless sector served by the access node; and
      responsive to changes in the channel conditions, adjusting one or more sector-wide reference signal reporting parameters for the plurality of wireless devices in the wireless sector.

10. The system of claim 9, wherein the channel conditions comprise one or more of a pathloss or a fading parameter, and the reference signal parameters comprise one or more of a reporting frequency or a timing offset.

11. The system of claim 10, wherein the operations further comprise determining an increase in the pathloss or the fading parameter, and increasing the reporting frequency or adjusting the timing offset.

12. The system of claim 10, wherein the operations further comprise determining a decrease in the pathloss or the fading parameter, and reducing the reporting frequency.

13. The system of claim 9, wherein the operations comprise broadcasting the sector-wide reference signal reporting parameter to all wireless devices within the sector.

14. A processing node for adjusting reference signal reporting in dual-connectivity wireless networks based on channel conditions, the processing node being configured to perform operations comprising,
   monitoring channel conditions for a plurality of communication channels between a plurality of wireless devices and an access node within a wireless sector served by the access node; and
   responsive to changes in the channel conditions, adjusting one or more sector-wide reference signal reporting parameters for the plurality of wireless devices in the wireless sector.

15. The processing node of claim 14, wherein the channel conditions comprise one or more of a pathloss or a fading parameter, and the reference signal parameters comprise one or more of a reporting frequency or a timing offset.

16. The processing node of claim 15, further comprising determining an increase in the pathloss or the fading parameter, and increasing the reporting frequency or adjusting the timing offset.

* * * * *